United States Patent
Adams et al.

(10) Patent No.: US 11,685,322 B2
(45) Date of Patent: Jun. 27, 2023

(54) WIRING HARNESS ASSEMBLY HAVING 3-DIMENSIONAL SLEEVE GUIDE, AND METHOD OF MAKING SAME

(71) Applicant: Caterpillar Inc., Peoria, IL (US)

(72) Inventors: Mitchell Ryan Adams, Peoria, IL (US); Adam Fash, Normal, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 17/012,986

(22) Filed: Sep. 4, 2020

(65) Prior Publication Data

US 2022/0073014 A1 Mar. 10, 2022

(51) Int. Cl.
*B60R 16/02* (2006.01)
*H01R 43/28* (2006.01)

(52) U.S. Cl.
CPC ......... *B60R 16/0215* (2013.01); *H01R 43/28* (2013.01)

(58) Field of Classification Search
None
See application file for complete search history.

(56) References Cited

U.S. PATENT DOCUMENTS

| | | | | |
|---|---|---|---|---|
| 2,805,471 A | * | 9/1957 | Lowden | H05K 13/065 29/721 |
| 2,941,027 A | * | 6/1960 | Svec | H02G 3/06 174/DIG. 11 |
| 2,997,531 A | * | 8/1961 | Oldham | F02P 7/025 24/336 |
| 3,180,923 A | * | 4/1965 | Gow | H02G 3/0487 174/DIG. 11 |
| 3,357,455 A | * | 12/1967 | Plummer | F16L 3/233 174/DIG. 11 |
| 4,085,286 A | * | 4/1978 | Horsma | F16L 57/00 219/505 |
| 4,163,372 A | * | 8/1979 | Frye | F25B 41/37 62/262 |
| 4,288,107 A | * | 9/1981 | Schwartze | H02G 15/046 285/381.4 |

(Continued)

FOREIGN PATENT DOCUMENTS

| | | | | |
|---|---|---|---|---|
| CN | 1243482 A | * | 2/2000 | ............. B60R 13/02 |
| CN | 100566060 C | * | 12/2009 | ......... B60R 16/0215 |

(Continued)

OTHER PUBLICATIONS

Hellermanntyton, p. 72 of Heat Shrinkable Moulded Shapes Product Guide, Published as early as Oct. 31, 2016. https://www.hellermanntyton.com/shared/datasheets/890750.pdf.

*Primary Examiner* — Timothy J. Dole
*Assistant Examiner* — Muhammed Azam
(74) *Attorney, Agent, or Firm* — Brannon Sowers & Cracraft PC

(57) ABSTRACT

An electrical wiring harness assembly includes a wiring harness formed by bundled electrical lines, and including breakouts diverging from a main trunk. A sleeve guide encloses a compound junction formed by the main trunk and the breakouts and includes a plurality of breakout guide tubes receiving the plurality of breakouts and fixing outgoing trajectories of the plurality of breakouts from the main trunk in a 3-dimensional pattern where the outgoing trajectories all differ, relative to the center axis of the sleeve guide, in at least one of a longitudinal, a circumferential, or an angular aspect.

7 Claims, 5 Drawing Sheets

(56) References Cited

U.S. PATENT DOCUMENTS

| | | | | |
|---|---|---|---|---|
| 4,298,415 | A * | 11/1981 | Nolf | F16L 47/20 174/DIG. 8 |
| 4,311,871 | A * | 1/1982 | Brunner | H02G 15/04 174/74 A |
| 4,467,137 | A * | 8/1984 | Jonathan | H02G 15/1806 174/DIG. 8 |
| 4,626,067 | A * | 12/1986 | Watson | G02B 6/4472 385/86 |
| 4,660,571 | A * | 4/1987 | Hess | A61B 18/1492 606/49 |
| 4,689,474 | A * | 8/1987 | Overbergh | B29C 61/0641 219/505 |
| 4,792,472 | A * | 12/1988 | Meltsch | H02G 15/1806 428/167 |
| 4,820,189 | A * | 4/1989 | Sergeant | H01R 43/28 439/400 |
| 5,157,853 | A * | 10/1992 | Piana | G09F 3/0295 40/660 |
| 5,359,927 | A * | 11/1994 | Demeyer | B43K 23/001 101/35 |
| 5,499,981 | A * | 3/1996 | Kordis | A61N 1/056 606/41 |
| 5,714,715 | A * | 2/1998 | Sundhararajan | H02G 15/046 174/23 R |
| 6,352,503 | B1 * | 3/2002 | Matsui | A61B 1/00147 600/106 |
| 6,582,395 | B1 * | 6/2003 | Burkett | A61M 25/04 604/910 |
| 6,949,709 | B1 * | 9/2005 | Barat | H05K 1/118 264/254 |
| 7,437,688 | B2 | 10/2008 | Graham et al. | |
| 7,635,813 | B2 * | 12/2009 | Taylor | H02G 15/24 174/93 |
| 8,547,108 | B2 * | 10/2013 | Lussier | H01R 29/00 324/538 |
| 9,558,866 | B2 | 1/2017 | Shiga | |
| 10,399,515 | B2 * | 9/2019 | Shimizu | B60R 16/023 |
| 10,647,271 | B2 * | 5/2020 | Toyoshima | H02G 3/32 |
| 10,711,921 | B2 * | 7/2020 | Barger | H02G 3/32 |
| 11,242,015 | B2 * | 2/2022 | Maeda | B60R 16/0215 |
| 11,285,890 | B2 * | 3/2022 | Enomoto | B60R 16/0215 |
| 2002/0079697 | A1 * | 6/2002 | Griffioen | G02B 6/4476 285/133.11 |
| 2002/0157235 | A1 * | 10/2002 | Napolitano, Jr. | B60N 2/818 29/523 |
| 2002/0158048 | A1 * | 10/2002 | Stricklen | B23K 9/1336 228/41 |
| 2002/0169502 | A1 * | 11/2002 | Mathis | A61B 17/3421 623/2.11 |
| 2003/0075062 | A1 * | 4/2003 | Grieser | B23B 5/168 101/216 |
| 2003/0163917 | A1 * | 9/2003 | Davidshofer | H01R 43/28 29/748 |
| 2003/0221858 | A1 * | 12/2003 | James | B60R 16/0215 174/93 |
| 2007/0219529 | A1 * | 9/2007 | Abe | A61M 25/0068 604/528 |
| 2008/0115969 | A1 * | 5/2008 | Micu | F02D 41/26 174/72 A |
| 2008/0243176 | A1 * | 10/2008 | Weitzner | A61B 1/00154 600/114 |
| 2013/0169041 | A1 * | 7/2013 | Fukaya | B60R 16/0207 307/10.1 |
| 2013/0292159 | A1 * | 11/2013 | Gotou | B60R 16/0215 174/250 |
| 2014/0311796 | A1 * | 10/2014 | Gannon | H01B 7/2825 174/72 A |
| 2015/0175095 | A1 * | 6/2015 | Inao | H01B 13/00 174/72 C |
| 2016/0144808 | A1 * | 5/2016 | Date | H02G 3/0481 174/72 A |
| 2018/0212410 | A1 * | 7/2018 | Helmick | B60R 16/0215 |
| 2019/0036313 | A1 * | 1/2019 | Okamoto | B60R 16/0215 |
| 2019/0222005 | A1 * | 7/2019 | Steinkamp | H01R 25/003 |
| 2019/0329724 | A1 | 10/2019 | Izawa | |
| 2021/0159654 | A1 * | 5/2021 | Patz | H01R 43/005 |
| 2022/0073014 | A1 * | 3/2022 | Adams | B60R 16/0215 |

FOREIGN PATENT DOCUMENTS

| | | | | |
|---|---|---|---|---|
| CN | 110474283 A | * | 11/2019 | ......... B60R 16/0215 |
| CN | 111216659 A | * | 6/2020 | ......... B60R 16/0215 |
| CN | 113135155 A | * | 7/2021 | ......... B60R 16/0207 |
| DE | 4311188 A1 | | 10/1994 | ......... H01R 43/28 |
| DE | 19600624 A1 | * | 7/1997 | ......... B60R 16/0215 |
| WO | WO-9200623 A1 | * | 1/1992 | |
| WO | WO-9910206 A1 | * | 3/1999 | ......... B60R 16/0207 |
| WO | WO-9911492 A1 | * | 3/1999 | ......... B29C 44/12 |
| WO | WO-2019181141 A1 | * | 9/2019 | ......... B60R 16/0215 |

\* cited by examiner

US 11,685,322 B2

WIRING HARNESS ASSEMBLY HAVING 3-DIMENSIONAL SLEEVE GUIDE, AND METHOD OF MAKING SAME

TECHNICAL FIELD

The present disclosure relates generally to electrical wiring harnesses, and more particularly to a sleeve guide in a wiring harness assembly having breakout guide tubes oriented to fix outgoing trajectories of wire breakouts in a 3-dimensional pattern.

BACKGROUND

Electrical wiring harnesses are groupings of electrical wires provided for communication of electrical power and commonly also data between and among electrical components in machine systems. Simpler wiring harnesses route the wires through or upon a machine structure in generally parallel fashion. More complex wiring harnesses route the wires in a manner generally designed to be efficient and avoid unnecessary wire length or interference with machine components and structures. In most applications, a completed wiring harness must fit within certain packaging or spacing parameters. Machine-dependent standards may also be considered in wiring harness design, for instance relating to proximity of wires to a heat source, or proximity to moving parts or other structures of a machine. Limits on bend radiuses of wires, presence or absence of clips, routing locations, terminating locations, and many other factors influence wiring harness design.

More complex electrical wiring harnesses are typically constructed using a 2-dimensional form board, with individual wires and wire bundles taped or otherwise fixed into position and the various "breakouts," where some of the electrical wires diverge from a main trunk, established by an assembly technician manually placing and organizing individual wires until the wiring harness is fully assembled. Once assembled, a wiring harness may be wrapped with a braided material or otherwise secured into a desired configuration. One known electrical wiring harness design and construction strategy is set forth in U.S. Pat. No. 7,437,688 to Graham et al.

SUMMARY OF THE INVENTION

In one aspect, an electrical wiring harness assembly includes a wiring harness having a main trunk formed by bundled electrical lines and including an undivided trunk section, a divided trunk section, and a plurality of breakouts each including at least one of the electrical lines and diverging from the main trunk at locations between the undivided trunk section and the divided trunk section to form, together with the main trunk, a compound junction. The main trunk extends from an originating end through the compound junction, and the plurality of breakouts extend to a plurality of terminating ends. The wiring harness further includes at least one electrical connector connected to the originating end, and a plurality of electrical connectors connected to the plurality of terminating ends. The assembly further includes a one-piece sleeve guide enclosing the compound junction and defining a center axis. The one-piece sleeve guide includes an incoming guide tube receiving the undivided trunk section, an outgoing guide tube coaxially arranged with the incoming guide tube and receiving the divided trunk section, and a plurality of breakout guide tubes. The plurality of breakout guide tubes each receive one of the plurality of breakouts and fix outgoing trajectories of the plurality of breakouts from the main trunk in a 3-dimensional pattern where the outgoing trajectories all differ, relative to the center axis, in at least one of a longitudinal, a circumferential, or an angular aspect.

In another aspect, a sleeve guide for a wiring harness includes a one-piece sleeve guide body defining a center axis and including an incoming guide tube and an outgoing guide tube forming, respectively, an incoming segment and an outgoing segment of a through-bore structured to receive an undivided trunk section and a divided trunk section, of a main trunk of a wiring harness. The one-piece sleeve guide body further includes an enlarged middle section formed in part by each of the incoming guide tube and the outgoing guide tube, and forms a wire bend cavity connecting between the incoming segment and the outgoing segment of the through-bore. The one-piece sleeve guide body further includes a plurality of breakout guide tubes each forming a transverse bore connected to the wire bend cavity and structured to receive one of a plurality of breakouts of the wiring harness diverging from the main trunk at locations between the undivided trunk section and the divided trunk section. The plurality of breakout guide tubes are attached to the enlarged middle section and arranged at a plurality of different locations circumferentially around the center axis, and advance outwardly from the enlarged middle section so as to fix outgoing trajectories of the plurality of breakouts in a 3-dimensional pattern about the center axis.

In still another aspect, a method of making a wiring harness assembly includes receiving a wiring harness having a main trunk formed by bundled electrical lines and having an undivided trunk section, a divided trunk section, and a plurality of breakouts each including at least one of the electrical lines and diverging from the main trunk at locations between the undivided trunk section and the divided trunk section. The method further includes feeding the main trunk of the wiring harness through an incoming guide tube of a sleeve guide, and feeding the plurality of breakouts through a plurality of breakout guide tubes of the sleeve guide. The method still further includes fixing outgoing trajectories of the plurality of breakouts from the main trunk in a 3-dimensional pattern based on the feeding of the plurality of breakouts through the plurality of breakout guide tubes, and such that the outgoing trajectories all differ, relative to a center axis of the sleeve guide, in at least one of a longitudinal, a circumferential, or an angular aspect.

DETAILED DESCRIPTION

Figure 1:
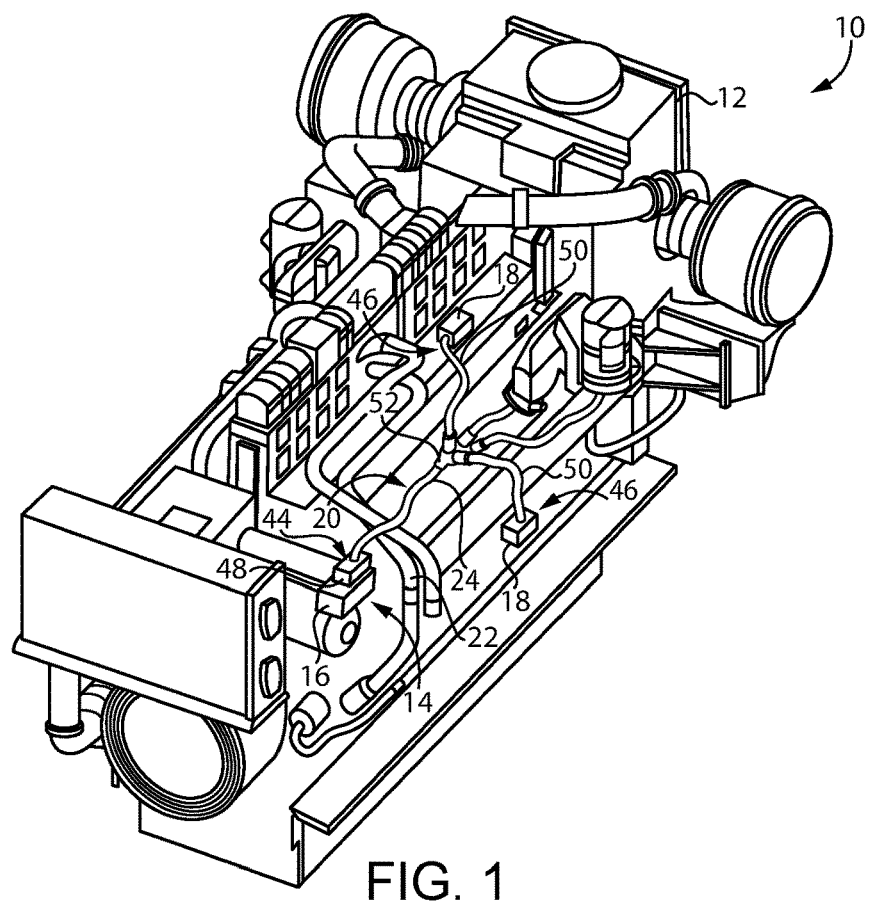
FIG. 1 is a diagrammatic view of a machine system having an electrical wiring harness assembly, according to one embodiment.

Referring to FIG. 1, there is shown a machine system 10 according to one embodiment, and including a machine 12 having an electrical system 14. Electrical system 14 includes an electrical power supply 16, a plurality of electrical devices 18, and an electrical wiring harness assembly 20 connecting electrical devices 18 to electrical power supply 16. Electrical power supply 16 can include or be electrically connected to other electrical system components in machine system 10 including a battery, an alternator, an engine control system, or still others. Machine system 10 is shown in the context of an internal combustion engine where machine 12 is an engine such as a diesel engine. Machine system 10 could include or be part of an off-highway machine such as a tractor, truck, excavator, backhoe, or still others, or could be part of a stand-alone system such as an engine generator set, a pump, a compressor, or still others.

Figure 2:
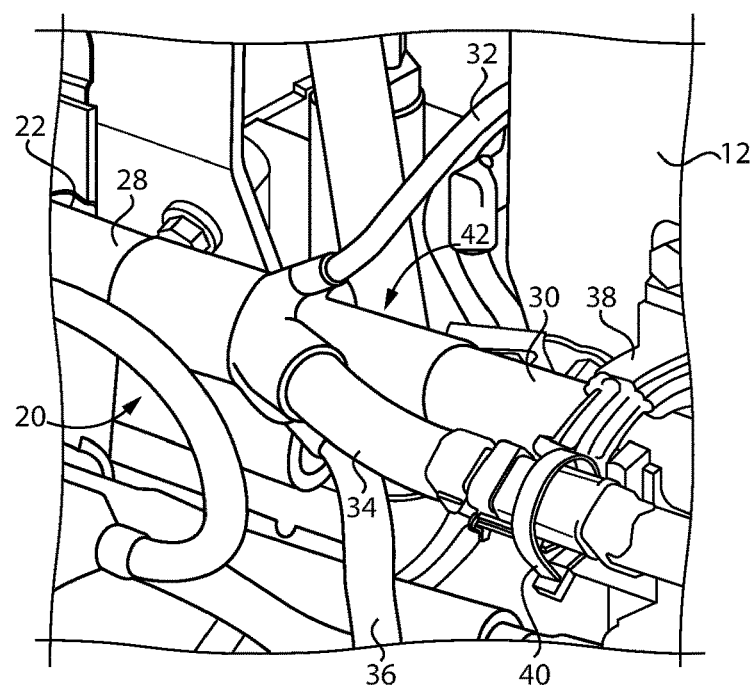
FIG. 2 is a diagrammatic view of an electrical wiring harness assembly, according to one embodiment.
Figure 3:
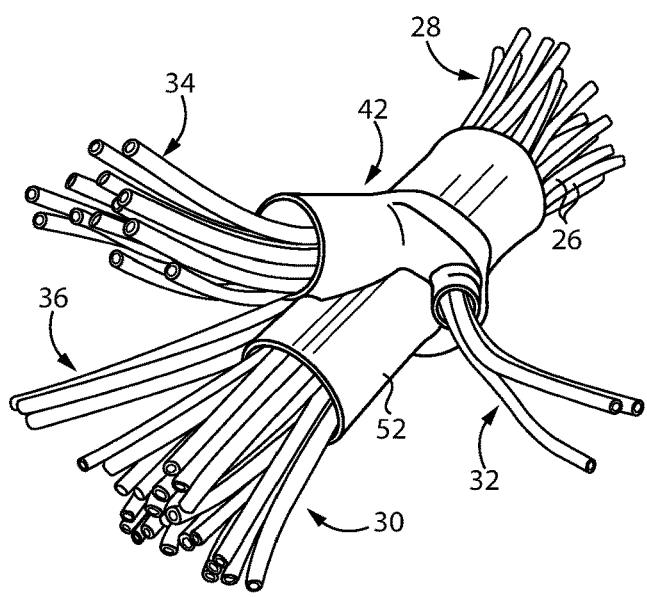
FIG. 3 is a diagrammatic view of a portion of the electrical wiring harness assembly of FIG. 2.
Figure 4:
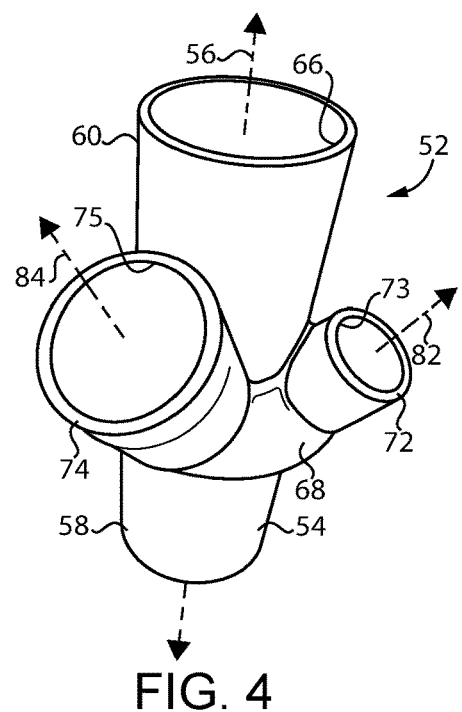
FIG. 4 is a perspective view of a sleeve guide for an electrical wiring harness assembly, according to one embodiment.
Figure 5:
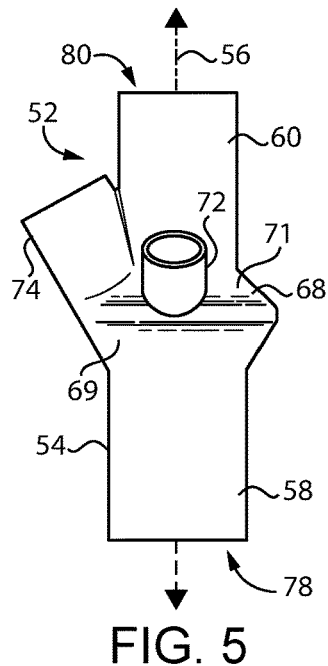
FIG. 5 is a side view of the sleeve guide of FIG. 4.
Figure 6:
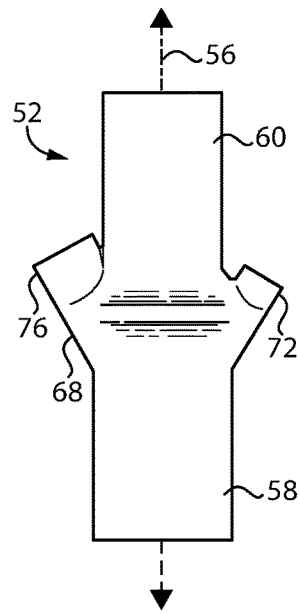
FIG. 6 is another side view of the sleeve guide of FIG. 4.

Referring also now to FIG. 2 and FIG. 3, electrical wiring harness assembly 20 includes a wiring harness 22. Wiring harness 22 includes a main trunk 24 formed by bundled electrical lines 26. Bundled means that the electrical lines are separately insulated, and gathered together in parallel, twisted, or in some other configuration that is not coaxial. Main trunk 24 includes an undivided trunk section 28, a divided trunk section 30, and a plurality of breakouts 32, 34, and 36. Undivided trunk section 28 includes all of the electrical lines 26 that extend from some reference point and are not yet subdivided, physically separated, or isolated from another, or otherwise split into separate groups or runs such as in the form of breakouts or coaxial arrangements. Other breakouts at locations "upstream of" main trunk 24 in a direction of electrical power supply 16 might nevertheless be present. Divided trunk section 30 includes some of electrical lines 26 but where other ones of electrical lines 26 have been diverted relative to undivided trunk section 28, in other words divided out. Each of breakouts 32, 34, and 36 includes at least one of electrical lines 26 and diverges from main trunk 24 at a location between undivided trunk section 28 and divided trunk section 30 to form, together with main trunk 24, a compound junction 42. Junction 42 is compound in that it is the separation or joining, depending upon perspective, of more than two bundles, groupings, or individual ones of electrical lines 26. In FIG. 3 junction 42 is enclosed by a one-piece sleeve guide 52, as further discussed herein.

Main trunk 24 extends from an originating end 44 through compound junction 42, and breakouts 32, 34, and 36 extend to a plurality of terminating ends 46. Wiring harness 22 further includes at least one electrical connector 48 connecting to originating end 44, and a plurality of electrical connectors 50 connected to terminating ends 46 and to electrical devices 18. Electrical devices 18 can include any combination of sensors, electrical actuators, computers, motors, cameras, lights, or any of a great variety of different types of electrically powered equipment. Those skilled in the art will appreciate that a machine system could include many different pressure sensors, temperature sensors, voltage sensors, current sensors, position sensors, alarms, electrical actuators, and still other types of components. Electrical devices 18 could thus be any of these or still others, and electrical connectors 50 can include electrical plugs or the like that plug into electrical devices 18. As can also be seen from FIG. 2, parts of electrical wiring harness assembly 20 can be supported by one or more brackets 38 attached to machine 12, and one or more clips 40 attaching parts of main trunk 24 or breakouts 32, 34, 36 to machine 12 or components mounted thereon.

Referring also now to FIGS. 4-8, it will be recalled that electrical wiring harness assembly 20 includes a one-piece sleeve guide 52. Sleeve guide 52 encloses compound junction 42 and includes a one-piece sleeve guide body 54 defining a center axis 56 and having an incoming guide tube 58 and an outgoing guide tube 60 forming, respectively, an incoming segment 62 and an outgoing segment 64 of a through-bore 66 structured to receive undivided trunk section 28 and divided trunk section 30, of main trunk 24. Sleeve guide body 54 may be constructed of a plastic, rubber, or rubber-like material, or any other suitable material, and is typically electrically insulative. Sleeve guide body 54 further includes an enlarged middle section 68 formed in part by each of incoming guide tube 58 and outgoing guide tube 60, and enlarged middle section 68 forming a wire bend cavity 70 that accommodates bends in breakouts 32, 34, and 36 as they diverge from main trunk 24. Enlarged middle section 68 may further be understood to assist in routing breakouts 32, 34, and 36 during assembly and providing space for bends in the respective electrical lines, as further discussed herein.

Sleeve guide body 54 further includes a plurality of breakout guide tubes 72, 74, and 76 each forming a transverse bore 73, 75, and 77, respectively, connected to wire bend cavity 70 and each receiving one of breakouts 32, 34, and 36. Breakout guide tubes 72, 74, and 76 are attached to enlarged middle section 68 and arranged at a plurality of different locations circumferentially around center axis 56. Breakout guide tubes 72, 74, and 76 advance outwardly from enlarged middle section 68 so as to fix outgoing trajectories of breakouts 32, 34, and 36 in a 3-dimensional pattern about center axis 56. The outgoing trajectories all differ, relative to center axis 56, in at least one of a longitudinal, a circumferential, or an angular aspect. Differing in a longitudinal aspect means that the outgoing trajectories originate at different longitudinal locations relative to a running length of main trunk 24 and center axis 56. Differing in a circumferential aspect means the outgoing trajectories originate at different circumferential locations circumferentially around center axis 56. Differing in an angular aspect means that the outgoing trajectories are at different angles relative to a running length of main trunk 24 and center axis 56. Enlarged middle section 68 further includes an outer surface 69 upon incoming guide tube 58 that is continuous circumferentially around center axis 56, and an outer surface 71 upon outgoing guide tube 60 that is discontinuous circumferentially around center axis 56 and interrupted by breakout guide tubes 72, 74, and 76. Outer surface 69 upon incoming guide tube 58 and outer surface 71 upon outgoing guide tube 60 may each be conical or have another tapered or relatively enlarged shape, relative to incoming guide tube 58 and outgoing guide tube 60, providing an enlarged interior space for accommodating the various electrical lines and breakouts.

Figure 8:
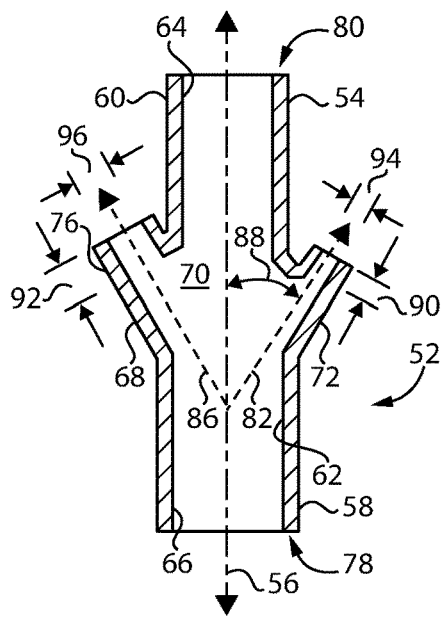
FIG. 8 is a sectioned side diagrammatic view of the sleeve guide of FIG. 4.

Sleeve guide body 54 may further include a first axial end 78 formed on incoming guide tube 58, and a second axial end 80 formed on outgoing guide tube 60. Transverse bores 73, 75, and 77 may define a plurality of transverse axes 82, 84, and 86 oriented at acute angles, one of which is shown in FIG. 8 at reference numeral 88, relative to center axis 56, and opening in a direction of second axial end 80 and divided trunk section 28. In an implementation, acute angle 88, and the other acute angles formed by the respective transverse axes 82, 84, and 86 and center axis 56, may be from about 15° to about 75°, and will typically be a multiple of 15°, such as 45° or 60°. The term "about" means generally or approximately as used herein, and as would be understood by a person skilled in the wiring harness design field. "About" may, but does not necessarily, mean within measurement error depending upon the context.

It will also be noted from FIGS. 4-8 that a number of breakout guide tubes 72, 74, and 76 is three. Sleeve guide 52 will typically include at least three breakout guide tubes, and could include four, five, or potentially more. As also shown in FIG. 8, in the section plane of the drawing, breakout guide tube 72 has a first axial length 90, and breakout guide tube 76 has a greater axial length 92. Breakout guide tube 72 has a first transverse bore diameter 94, and breakout guide tube 76 has a greater transverse bore diameter 96. A plurality of breakout guide tubes in a sleeve guide according to the present disclosure may have among them at least two different axial lengths from an enlarged middle section, and at least two different bore diameters among the respective transverse bores. The different axial lengths can accommodate different routing paths for the various breakouts, or aid in assembly or identification, and the different transverse bore diameters can accommodate different sizes of the respective breakouts, typically but not necessarily based on a number of constituent electrical lines. Breakout guide tubes in sleeve guide 52 may all differ from one another in both axial length and transverse bore diameter.

Figure 7:
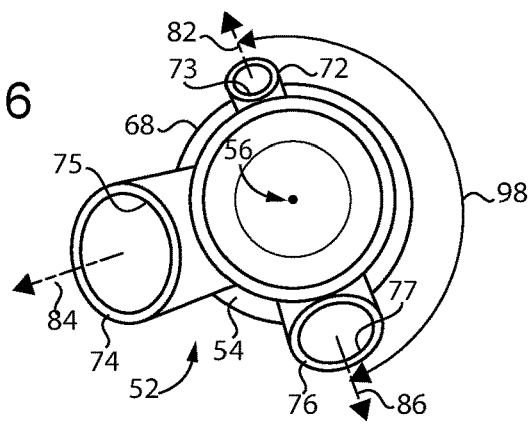
FIG. 7 is an end view of the sleeve guide of FIG. 4.

Referring in particular to the end view of FIG. 7, it can be noted that a distribution of breakout guide tubes 72, 74, and 76 circumferentially around center axis 56 is non-regular. An angular range 98 of about 180° or greater, circumferentially around center axis 56, is unobstructed by breakout guide tubes 72, 74, and 76. Other embodiments could include a different number of breakout guide tubes than that shown, orientations, could be non-uniformly oriented relative to center axis 56, could include similar or equal transform bore diameters and/or axial lengths amongst the breakout guide tubes, or could otherwise depart from the illustrated embodiments in various ways.

Figure 9:
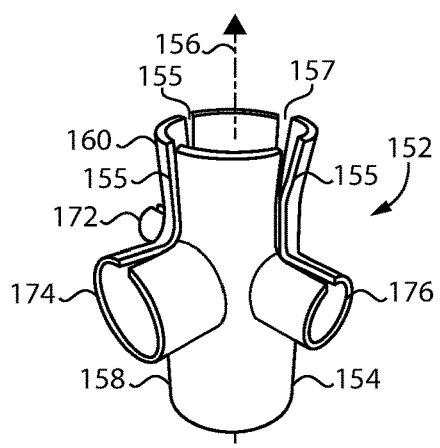
FIG. 9 is a perspective view of a sleeve guide for an electrical wiring harness assembly, according to another embodiment.
Figure 10:
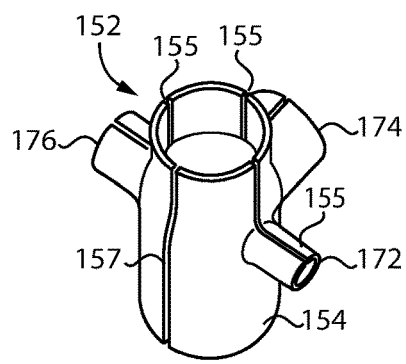
FIG. 10 is another perspective view of the sleeve guide of FIG. 9.

Referring now to FIG. 9, there is shown a sleeve guide 152 according to another embodiment, and having a one-piece sleeve guide body 154 with an incoming guide tube 158 and an outgoing guide tube 160. A plurality of breakout guide tubes 172, 174, and 176, extend radially outward relative to a center axis 156. In contrast to the embodiment discussed above, breakout guide tubes 172, 174, and 176 may extend radially outward and be oriented substantially normal to center axis 156. Breakout guide tubes 172, 174, and 176 may have among them different transverse bore diameters and similar or identical lengths. Sleeve guide 152 also differs from the embodiment discussed above in that at least one, and in the illustrated embodiment a plurality, of "splits" extend longitudinally through at least a portion of sleeve guide body 154. The splits described herein can be understood as a cut or a slot that passes entirely through a wall of a sleeve guide. In particular, sleeve guide body 154 includes longitudinally extending splits 155 formed in outgoing guide tube 160 and extending continuously through a part of each of breakout guide tubes 172, 174, and 176. Splits 155 can thus be understood to extend longitudinally in outgoing guide tube 160, and also longitudinally in breakout guide tubes 172, 174, and 176. Referring also to FIG. 10, another longitudinally extending split 157 extends all the way through an axial length of sleeve guide body 154, and is circumferentially offset from splits 155, in a portion of sleeve guide body 154 not obstructed by a breakout guide tube. Longitudinally extending splits 155 and 157 can be used to elastically deform sleeve guide body 154 to enable fitting a wiring harness, including a main trunk and breakouts, through sleeve guide body 154 during assembly. Any embodiment herein might include one or more splits in an incoming guide tube and/or an outgoing guide tube, and a split in at least one breakout guide tube.

Figure 11:
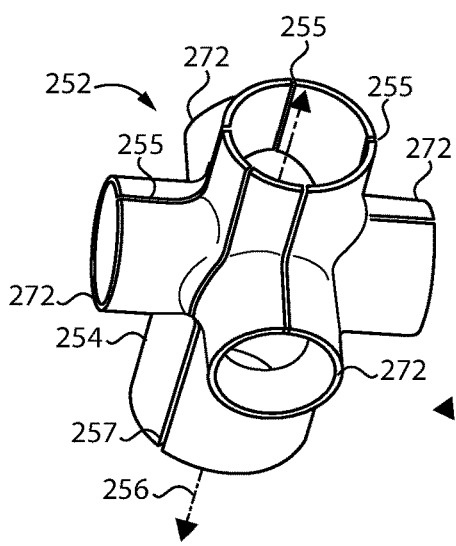
FIG. 11 is a perspective view of a sleeve guide for an electrical wiring harness assembly, according to another embodiment.

Referring now to FIG. 11, there is shown a sleeve guide 252 according to yet another embodiment and including a sleeve guide body 254 defining a center axis 256. Sleeve guide body 254 includes a total of four breakout guide tubes 242 each similarly or identically configured to one another and spaced apart about 90° circumferentially around center axis 256. A plurality of longitudinally extending splits 255 extend longitudinally part-way through sleeve guide body 254, and part-way through each of breakout guide tubes 272. Another longitudinally extending split 257 extends axially all the way through sleeve guide body 254, spaced circumferentially about 45° from each of two breakout guide tubes 272.

Figure 17:
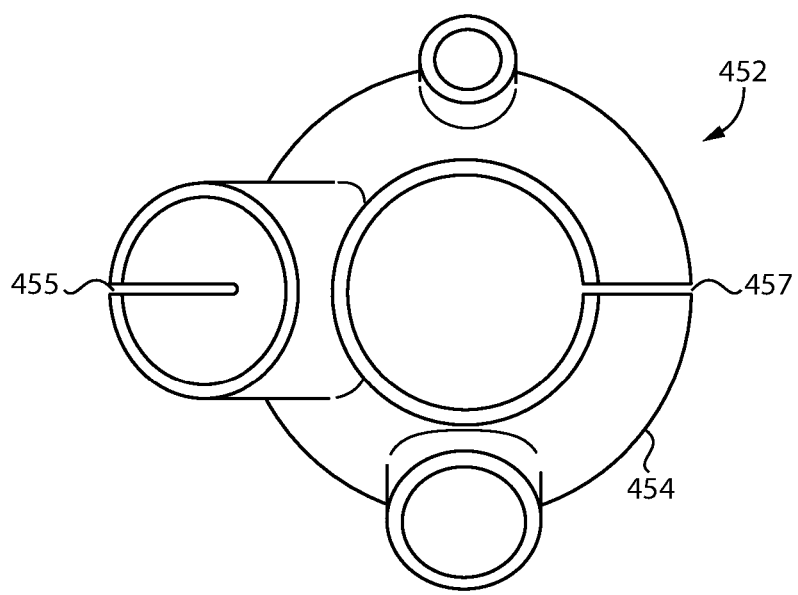
FIG. 17 is an end view of a sleeve guide, according to yet another embodiment.

Referring now to FIG. 17, there is shown a sleeve guide 452, including a sleeve guide body 454, configured substantially identical to sleeve guide 52 above, in an end view, but including a longitudinally extending split 455 extending through a breakout guide tube 472, and a second longitudinally extend split 457 extending fully axially through sleeve 452.

Figure 12:
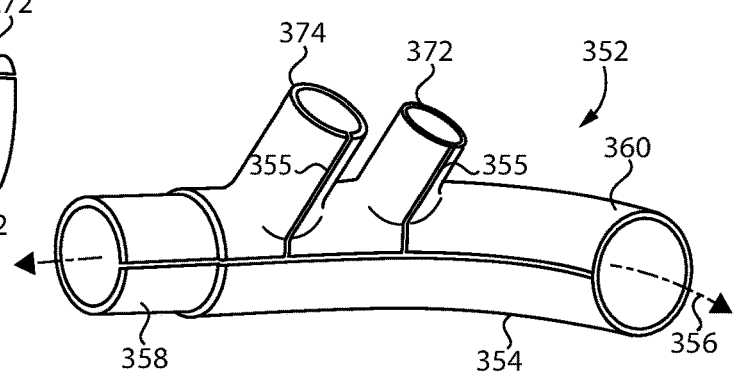
FIG. 12 is a perspective view of a sleeve guide for an electrical wiring harness assembly, according to yet another embodiment.

Referring now to FIG. 12, there is shown a sleeve guide 352 according to yet another embodiment. In the embodiment of FIG. 12, a sleeve guide body 354 includes an incoming guide tube 358 and an outgoing guide tube 360. A center axis 356 is defined by sleeve guide body 354, and has an arcuate or angular path based upon a curved shape of outgoing guide tube 360 relative to incoming guide tube 358, which is substantially straight. A plurality of breakout guide tubes 372 and 374 have similar or identical circumferential locations about center axis 356, and similar angular orientations relative to center axis 356, but are spaced longitudinally apart from one another relative to center axis 356. Breakout guide tubes 372 and 374 have different axial lengths and different transverse bore diameters in the illustrated embodiment. Splits 355 are longitudinally extending within each of breakout guide tubes 372 and 374.

INDUSTRIAL APPLICABILITY

Figure 13:
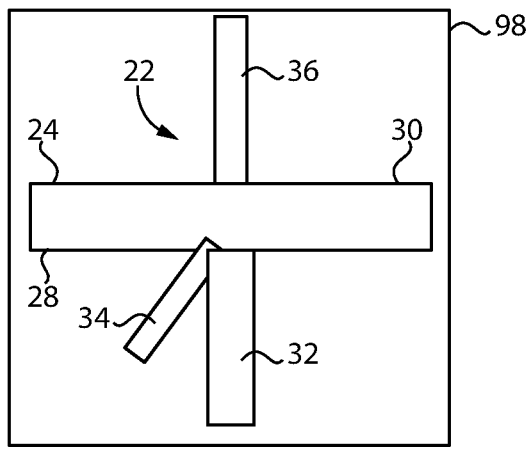
FIG. 13 is a diagrammatic view of an electrical wiring harness assembled upon a 2-dimensional form board.

Referring now to FIG. 13, it will be recalled that wiring harnesses are commonly constructed upon a 2-dimensional form board. In FIG. 13 wiring harness 22 is shown as it might appear with main trunk 24 attached to a 2-dimensional form board 98, and breakouts 32, 34, and 36 spread out laterally from main trunk 24 and also attached to form board 98. It has been observed that during wiring harness assembly the necessity for manual construction can lead to variability from one wiring harness to another due to the wiring harnesses being built on a 2-dimensional form board, but having no support for further processing to obtain or maintain a 3-dimensional form. Quality and consistency of construction can vary based upon the individual personnel tasked with constructing any particular wiring harness.

Figure 14:
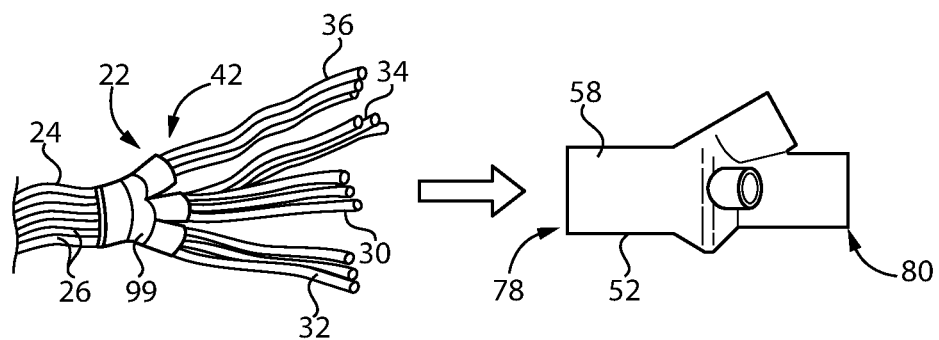
FIG. 14 is a diagrammatic view of an electrical wiring harness assembly at one stage of assembly.
Figure 15:
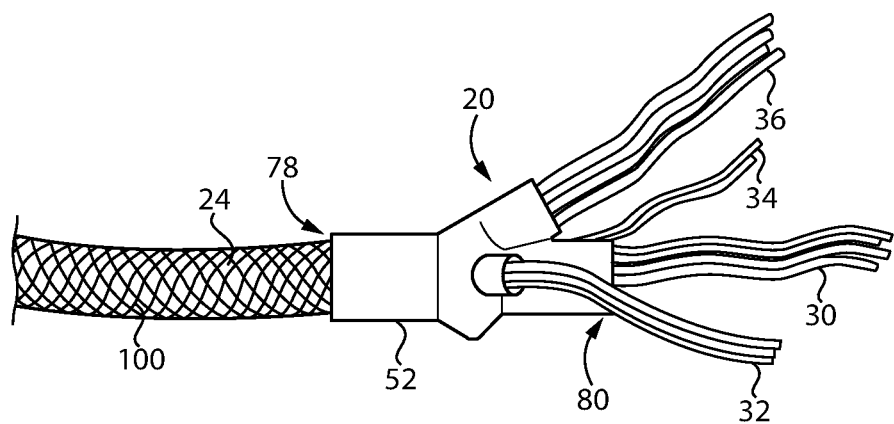
FIG. 15 is a diagrammatic view of an electrical wiring harness assembly at another stage of assembly.
Figure 16:
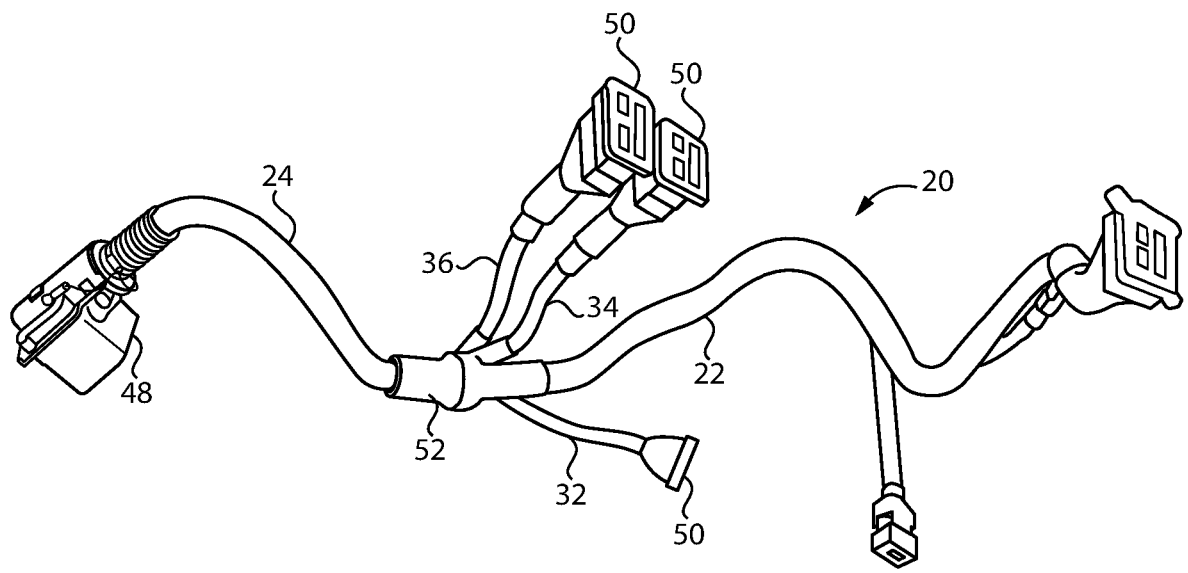
FIG. 16 is a diagrammatic view of an assembled electrical wiring harness assembly, according to one embodiment.

When a wiring harness is being constructed, once a basic form has been created on a 2-dimensional form board, a braider will typically tape junctions such that the various electrical wires can be maintained in separate groupings. With tape applied, a machine braiding process will typically be undertaken with a braid applied around the main trunk and breakouts to finalize the desired 3-dimensional shape. As suggested above, however, considerable part-to-part variability often occurs due to the manual nature of the process. Referring now to FIG. 14, there is shown wiring harness 22 having tape 99 applied to separate breakouts 32, 34, and 36 extending from main trunk 24. According to the present disclosure, making wiring harness assembly 20 can include receiving wiring harness 22 after decoupling at least a portion of main trunk 24 and breakouts 32, 34, and 36 from 2-dimensional form board 98. Main trunk 24 can be fed through incoming guide tube 58 of sleeve guide 52. Breakouts 32, 34, and 36 can be fed through the respective breakout guide tubes. FIG. 14 illustrates wiring harness 22 as it might appear prior to being fed into and coupled with sleeve guide 52. It will be recalled that a sleeve guide according to the present disclosure can be equipped with one or more "splits" to assist in feeding wiring harness 22 through sleeve guide 52, or any of the other sleeve guides contemplated herein. Feeding main trunk 24 and breakouts 32, 34, and 36 into sleeve guide 52 in this general manner can fix outgoing trajectories of the respective breakouts in the desired 3-dimensional pattern reliably and consistently, and as described herein such that the outgoing trajectories all differ, relative to center axis 56 of sleeve guide 52, in at least one of a longitudinal, a circumferential, or an angular aspect, and commonly differing in two of or even all three of a longitudinal, a circumferential, or an angular aspect. In FIG. 15 a braid 100 has been applied to main trunk 24, and breakouts 32, 34, and 36 extend out of sleeve guide 52 and are separating and positioned for braiding with the desired 3-dimensional configuration of wiring harness assembly 20 obtained. Referring now to FIG. 16, there is shown wiring harness assembly 22 as it might appear constructed and equipped with electrical connectors 48 and 50 in anticipation of shipping or installation in machine system 10 and ultimately connection to electrical power supply 16 and electrical devices 18 as described herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sleeve guide for a wiring harness comprising:
a one-piece sleeve guide body defining a center axis and including an incoming guide tube and an outgoing guide tube forming, respectively, an incoming segment and an outgoing segment of a through-bore structured to receive an undivided trunk section and a divided trunk section, of a main trunk of a wiring harness;
the one-piece sleeve guide body further including an enlarged middle section formed in part by each of the incoming guide tube and the outgoing guide tube, and forming a wire bend cavity connecting between the incoming segment and the outgoing segment of the through-bore;
the one-piece sleeve guide body further including a plurality of breakout guide tubes each forming a transverse bore connected to the wire bend cavity and structured to receive one of a plurality of breakouts of the wiring harness diverging from the main trunk at locations between the undivided trunk section and the divided trunk section;
the plurality of breakout guide tubes are attached to the enlarged middle section and arranged at a plurality of different locations circumferentially around the center axis, and advance outwardly from the enlarged middle section so as to fix outgoing trajectories of the plurality of breakouts in a 3-dimensional pattern about the center axis; and
the enlarged middle section has an outer surface upon the incoming guide tube that is continuous circumferentially around the center axis, and an outer surface upon the outgoing guide tube that is discontinuous circumferentially around the center axis and interrupted by the plurality of breakout tubes; and
the outer surface upon the incoming guide tube and the outer surface upon the outgoing guide tube are each conical.

2. The sleeve guide of claim 1 wherein:
the one-piece sleeve guide body further includes a first axial end formed on the incoming guide tube, and a second axial end formed on the outgoing guide tube; and
the plurality of transverse bores define a plurality of transverse axes oriented at acute angles, relative to the center axis, opening in a direction of the second axial end.

3. The sleeve guide of claim 2 wherein the one-piece sleeve guide body further has a longitudinally extending split formed in at least one of the incoming guide tube or the outgoing guide tube.

4. The sleeve guide of claim 2 wherein a number of the plurality of breakout guide tubes is three or greater, and the plurality of breakout guide tubes have among them at least two different axial lengths from the enlarged middle section, and at least two different diameters among the respective transverse bores.

5. The sleeve guide of claim 4 wherein the plurality of breakout guide tubes all differ from one another in axial length and transverse bore diameter.

6. The sleeve guide of claim 4 where at least one of the plurality of breakout guide tubes has a longitudinally extending split formed therein.

7. The sleeve guide of claim 1 wherein a distribution of the plurality of breakout guide tubes circumferentially around the center axis is non-regular, and an angular range of about 180° or greater, circumferentially around the center axis, is unobstructed by the plurality of breakout guide tubes.

\* \* \* \* \*